(12) United States Patent
Barnett (10) Patent No.: US 6,739,133 B2
(45) Date of Patent: May 25, 2004

(54) MOTORCYCLE CONTROL LEVER (76) Inventor: Robert L. Barnett, 2090 Meyer Pl., Costa Mesa, CA (US) 92627

( * ) Notice: Subject to any disclaimer, the term of this patent is extended or adjusted under 35 U.S.C. 154(b) by 68 days.

(21) Appl. No.: 10/118,536

(22) Filed: Apr. 8, 2002

(65) Prior Publication Data

US 2003/0101722 A1 Jun. 5, 2003

Related U.S. Application Data (60) Provisional application No. 60/336,606, filed on Dec. 3, 2001.

(51) Int. Cl.⁷ .................................................. F15B 7/08
(52) U.S. Cl. ........................................................ 60/594
(58) Field of Search ............................................ 60/594

(56) References Cited

U.S. PATENT DOCUMENTS

| | | | |
|---|---|---|---|
| 3,808,908 A | 5/1974 | Guerr | |
| 4,019,402 A | 4/1977 | Leonheart | |
| 4,181,190 A | 1/1980 | Yang | |
| 4,232,565 A | 11/1980 | Leonheart | |
| 4,301,694 A | 11/1981 | Costa | |
| 4,635,442 A | * 1/1987 | Bass | 60/594 |
| 4,762,018 A | 8/1988 | Yoshigai | |
| 5,050,381 A | * 9/1991 | Matsuno et al. | 60/594 |
| 5,279,180 A | 1/1994 | Henriksson | |
| 5,311,792 A | 5/1994 | Brown et al. | |
| 5,385,070 A | 1/1995 | Tseng | |
| 5,443,134 A | 8/1995 | Gajek et al. | |
| 5,549,017 A | 8/1996 | Lin | |
| 6,298,744 B1 | 10/2001 | Huang | |
| 6,336,327 B1 | * 1/2002 | Noro et al. | 60/594 |
| 6,370,877 B1 | * 4/2002 | Lin | 60/594 |
| 6,393,936 B1 | 5/2002 | Barnett | |

FOREIGN PATENT DOCUMENTS

| | | |
|---|---|---|
| DE | 37 06 545 A | 9/1988 |
| DE | 89 13 278 U | 4/1990 |
| DE | 44 08 741 A | 10/1994 |

* cited by examiner

Primary Examiner—Edward K. Look
Assistant Examiner—Michael Leslie
(74) Attorney, Agent, or Firm—Knobbe, Martens, Olson & Bear, LLP (57) ABSTRACT A control lever for operating a control system of a vehicle, such as a brake or clutch of a motorcycle, for example. The lever is especially useful with hydraulic control systems, for applying a force to a hydraulic piston of the control system. Preferably, the lever includes an engagement portion that contacts an end surface of the piston. The engagement portion may be free to rotate with respect to a body portion of the lever such that the engagement portion rolls across the end surface of the piston. Such an arrangement provides improved lever "feel" and substantially prevents transverse loading of the piston. The engagement portion may also include a protruding arm that engages the end surface of the piston, for use with hydraulic control systems where the piston is recessed within a housing.

17 Claims, 7 Drawing Sheets

MOTORCYCLE CONTROL LEVER

PRIORITY INFORMATION

This application claims priority to U.S. Provisional Application No. 60/336,606, filed on Dec. 3, 2001, the entirety of which is incorporated by reference herein.

BACKGROUND OF THE INVENTION

1. Field of the Invention

The present invention relates to control lever assemblies for operating a control system of a vehicle. More specifically, the present invention relates to an improved control lever, especially suited for use with a front brake or manual clutch system of an off-road motorcycle.

2. Description of the Related Art

Control levers are commonly mounted near a handgrip portion of a motorcycle's handlebar to permit a rider to operate a control system of the motorcycle, such as a front brake system or manual clutch system. Typically, the front brake system is hydraulically operated and, more recently, hydraulic manual clutch systems have also been utilized.

When used to operate a hydraulic control system, the control lever is arranged to rotate about a pivot axis and engage a piston of the control system to move the piston along an axis of motion and thereby operate the control system. Thus, articulating movement of the control lever results in linear movement of the piston.

For racing motorcycles in particular, it is highly desirable for the control lever to provide an accurate indication of the amount of force applied to the control system, so that the rider is able to effectively control the operation of the motorcycle. This is referred to as the "feel" of the lever. A lever with good "feel" enhances the rider's control of the motorcycle and promotes optimum performance. Prior control lever designs often possess an undesirable amount of operating friction either at the interface of the lever and the piston, or within the lever itself, during operation which results in a poor "feel" of the lever.

SUMMARY OF THE INVENTION

An aspect of the present invention involves the realization that prior control lever designs impart a force on the piston of the hydraulic control system that is not aligned with the piston's axis of movement throughout the movement of the lever. This results in an undesirable transverse loading condition of the piston, which may cause premature wear of a piston sealing arrangement, or of the piston itself. The transverse loading may occur as a result of the undesirable amount of operational friction inherent in prior control lever designs, as described above. Accordingly, a preferred control lever reduces the operational friction to provide a good lever "feel" and, preferably, substantially prevents transverse loading of the hydraulic piston of control system.

A preferred embodiment is a control lever for actuating a control system of a vehicle, the control system including a first portion mounted proximate a hand grip portion of the vehicle and defining a fluid cylinder. The control system also includes a piston movable along a longitudinal first axis of the fluid cylinder. The control lever assembly includes a lever body having a finger grip portion. The lever body defines a second axis substantially perpendicular to the first axis and is rotatable about the second axis to move the piston from a relaxed position to an actuated position. The lever body defines a third axis substantially parallel to the second axis. The lever also includes an engagement portion contacting the piston and rotating about the third axis when the lever body is rotated about the second axis. A force applied by the engagement portion to the piston moves the piston from the relaxed position to the actuated position. Wherein the first axis is fixed with respect to the second axis and the force is substantially aligned with the first axis when the piston is in both of the relaxed and actuated positions.

A preferred embodiment is a control lever for actuating a control system of a vehicle, the control system including a first portion mounted proximate a hand grip portion of the vehicle and defining a fluid cylinder. The control system further comprises a piston movable along a longitudinal first axis of the fluid cylinder. The control lever assembly includes a lever body having a finger grip portion and defining a second axis substantially perpendicular to the first axis. The lever body is rotatable about the second axis to move the piston from a relaxed position to an actuated position. The lever body also defines a third axis substantially parallel to the second axis. The lever further includes an engagement portion defining a circular peripheral edge surface about the third axis, which contacts the piston. The engagement portion rotates about the third axis when the lever body is rotated about the second axis. A force applied by the engagement portion to the piston moves the piston from the relaxed position to the actuated position and the first axis is fixed with respect to the second axis.

A preferred embodiment is a control lever for actuating a control system of a vehicle, the control system including a first portion mounted proximate a hand grip portion of the vehicle and defining a first fluid cylinder. A piston is movable along a longitudinal first axis of the first fluid cylinder. The control lever assembly includes a lever body having a finger grip portion, the lever body defining a second axis substantially perpendicular to the first axis. The lever body being rotatable about the second axis to move the piston from a first position to a second position. A shaft is fixed to the lever body and defines a third axis substantially parallel to the second axis. An engagement portion is held by the shaft and defines a contact surface for contacting the piston. The contact surface is configured to rotate about the third axis when the lever body is rotated about the second axis to move the piston from the first position to the second position.

A preferred embodiment is a control lever for actuating a control system of a vehicle, the control system including a first portion mounted proximate a hand grip portion of the vehicle and defining a first fluid cylinder and a piston movable along a longitudinal first axis of the first fluid cylinder. The control lever assembly includes a lever body having a finger grip portion and defining a second axis substantially perpendicular to the first axis. The lever body being rotatable about the second axis to move the piston from a first position to a second position and defining a third axis substantially parallel to the second axis. An engagement portion including an arm portion defines a contact surface for contacting the piston. A bearing assembly is operably positioned between the lever body and the engagement portion to permit the engagement portion to rotate about the third axis when the lever body is rotated about the second axis to move the piston from the first position to the second position.

BRIEF DESCRIPTION OF THE DRAWINGS

These and other features, aspects and advantages of the present invention are described below with reference to drawings of preferred embodiments, which are intended to illustrate, and not to limit, the present invention. The drawings comprise ten figures.

DETAILED DESCRIPTION OF THE PREFERRED EMBODIMENT

The present invention finds utility with a number of vehicles, including, without limitation, motorcycles, bicycles and other types of vehicles where control levers may be employed. In addition, advantages present in preferred embodiments may be realized with a number of different control lever functions, such as for use with a manual clutch, braking systems or engine decompression systems, which are commonly provided to ease manual kick starting. Illustrated embodiments of the control lever, however, are particularly suited for use with a hydraulic brake or clutch system of an off-road motorcycle.

Figure 1:
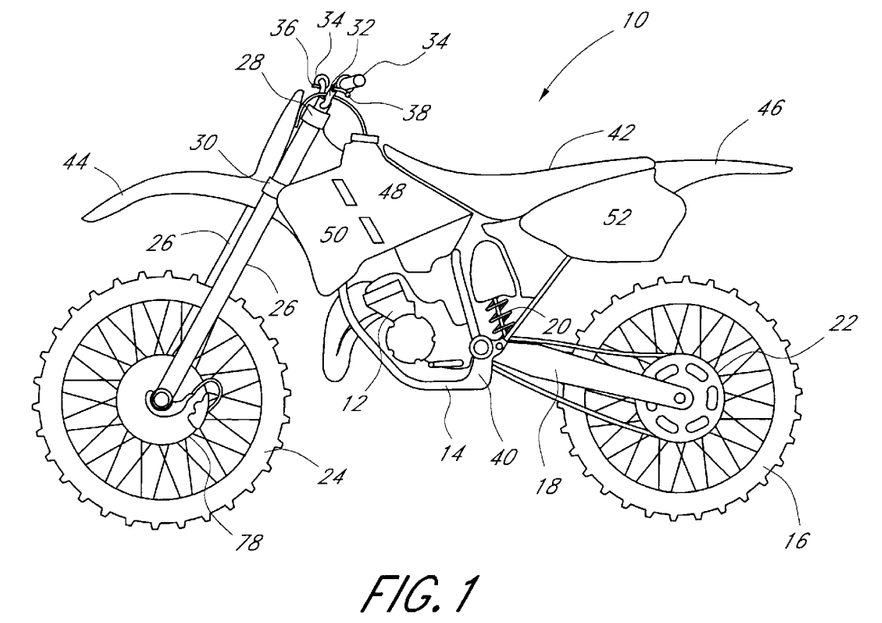
FIG. 1 is a side elevational view of an off-road motorcycle having a preferred control lever mounted to a handlebar assembly for actuating a front brake assembly of the motorcycle.

With reference to FIG. 1, an off-road motorcycle, generally referred to by the reference numeral 10, is shown. Preferably, an internal combustion engine 12 and associated transmission is mounted within a frame 14 of the motorcycle 10. A rear wheel 16 is connected to the frame 14 through a rear suspension system comprised of a swing arm 18 and a rear shock absorber 20. Preferably, the rear wheel 16 is driven by the engine 12 through a chain and sprocket drive assembly 22.

A front wheel 24 is connected to the frame 14 through a front suspension system comprised of a pair of telescoping suspension forks 26 and upper and lower fork clamps 28, 30. The fork clamps 28, 30 are connected to a steering stem (not shown) that is journaled for limited rotation about a steering axis defined by a head tube (not shown) of the frame 14, as is known in the art.

A handlebar assembly 32 is preferably connected to the upper fork clamp 28 for steering of the motorcycle 10. Preferably, each end of the handlebar assembly 32 includes a handgrip 34 for a rider of the motorcycle 10 to grasp. The handlebar assembly 32 provides a location in which to mount a plurality of rider controls, preferably including a twist type throttle assembly (not shown), an engine stop button (not shown), along with a brake lever 36 and a clutch lever 38. A typical arrangement would place the throttle and brake lever 38 on the right side of the handlebar assembly 32 (from the perspective of a rider seated on the motorcycle) and the clutch lever 38 and engine stop button on the left side of the handlebar assembly 32.

The motorcycle 10 also includes a pair of foot pegs 40, preferably mounted to a lower portion of each side of the frame 14, on which a rider of the motorcycle 10 may place his or her feet. An elongated straddle-type seat assembly 42 is provided for use when the rider is in a seated position. A plurality of body portions of the motorcycle 10 are provided, preferably including front and rear fenders 44, 46, a gas tank 48, a pair of radiator shrouds 50 (only one shown) and a pair of side panels 52 (only one shown).

Figure 2:
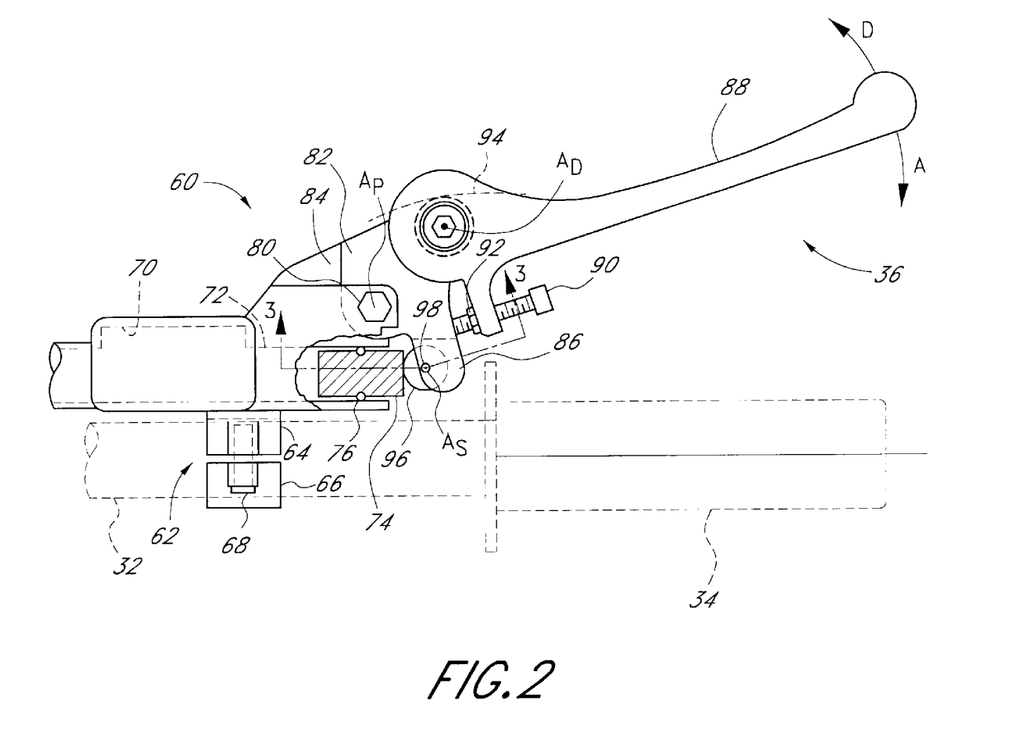
FIG. 2 is a top plan view, partial cutaway view of a right handgrip portion of the handlebar and control lever of FIG. 1, illustrating a roller rotatably mounted on the control lever and engaging a piston of the front brake assembly.
Figure 3:
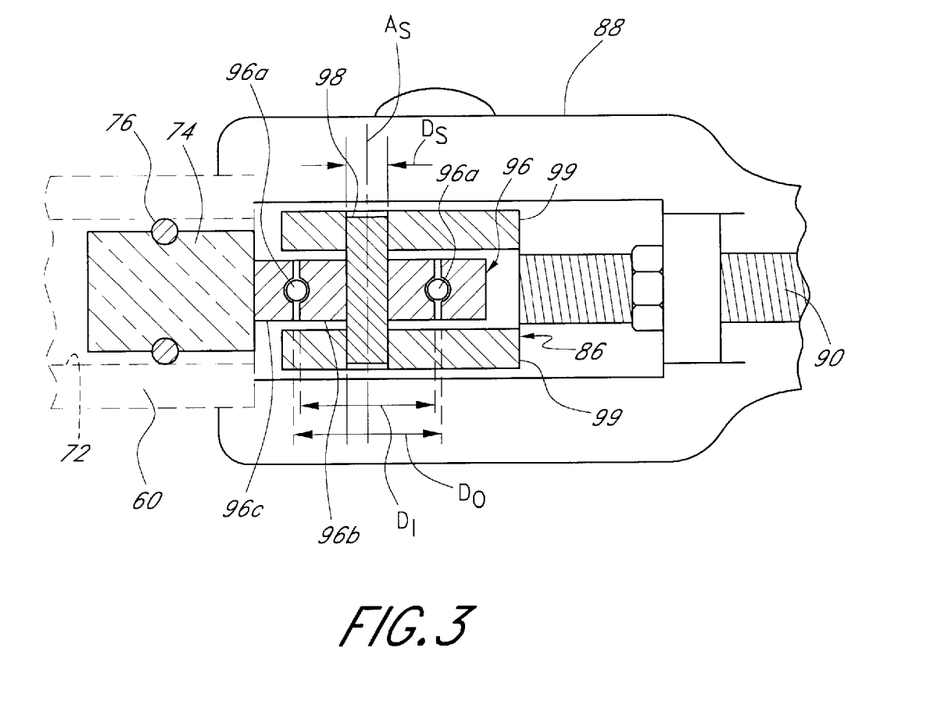
FIG. 3 is a partial cross-section of the control lever and front brake assembly taken along line 3—3 of FIG. 2.

With reference to FIGS. 2 and 3, a preferred embodiment of the front brake lever 36 is described in detail. As described above, the front brake lever 36 is mounted to the handlebar assembly 32 to be accessible to the rider when his or her hand is placed on the hand grip 34. The lever 36 is operable to actuate a hydraulic front brake system 60. The front brake system 60 is mounted to the handlebar 32 by a clamp arrangement 62. The clamp arrangement 62 includes a fixed portion 64 and a removable portion 66, which are removably connected to one another to clamp the handlebar 32 therebetween. Preferably, a pair of fasteners, such as bolts 68 (only one shown), couple the removable portion 66 to the fixed portion 64 and permit adjustment of the clamping force. The brake system 60 may be mounted to the handlebar 32 by other suitable methods, as may be determined by one of skill in the art.

Preferably, a reservoir 70 is defined within the portion of the brake system 60 coupled to the handlebar 32. The brake system 60 also includes a fluid cylinder 72 which supports a piston 74 for a translation therein. Desirably, a seal member, such as an O-ring 76, is positioned between the piston 74 and the cylinder portion 72 to inhibit hydraulic fluid from passing therebetween. In addition, the O-ring 76 inhibits wear of either the piston 74 or the cylinder portion 72.

The piston 74 is moveable from a first, or relaxed position, inwardly to a second, or actuated position. These positions are also referred to herein as unengaged and engaged positions, respectively. When moved toward its actuated position, the piston 74 increases the pressure of hydraulic fluid within the brake system 60 thereby actuating a front brake caliper 78 (FIG. 1). The brake system 60, apart from the lever 36, is preferably conventional and, therefore, has been described only in general detail to assist the reader's understanding of the advantages of the preferred embodiments. A further description of the brake system 60 is not deemed necessary for one of skill in the art to practice the present invention.

Preferably, the lever assembly 36 is pivotally mounted to the brake assembly 60 to rotate about a pivot axis $A_P$. In the illustrated embodiment, a bolt 80 includes a shaft portion (not shown) which extends through both the front brake assembly 60 and the lever 36 and defines the pivot axis $A_P$. A nut (not shown) preferably is threaded to a lower end of the bolt 80 to secure it in place.

The lever 36 includes an abutting portion 82 which abuts a stop portion 84 of the front brake assembly 60 to define a relaxed position of the lever 36. The lever 36 is moveable from the relaxed position, toward the handlebar 32, to an actuated position, as indicated by the arrow A in FIG. 2. The lever 36 contacts the piston 74 such that the piston 74 is moved toward its actuated position as the lever 36 is rotated toward the handlebar 32 (i.e., its actuated position), as is described in detail below.

The illustrated lever assembly 36 is a two-piece collapsible assembly designed to deflect in order to resist breakage during a crash or fall. The lever 36 includes an intermediate section 86, which is coupled to the brake assembly 60, and a fingergrip portion 88, which is rotatably connected to the intermediate section 86. However, the present invention may also be employed with a conventional, one-piece lever.

The fingergrip portion 88 abuts the intermediate section 86 such that movement of the fingergrip portion 88 towards the handlebar 32 causes rotation of the intermediate section 86 about the pivot axis $A_P$. Preferably, an adjustment screw 90 is held by the fingergrip portion 88 and abuts the intermediate section 86. The adjustment screw 90 may also be rotated relative to the fingergrip portion 88 to adjust the reach of the lever 36, i.e., the distance of the fingergrip portion 88 from the handlebar 32. A nut 92 is provided to retain the adjustment screw 90 in a desired position.

The fingergrip portion 88 is moveable, about a deflection axis $A_D$, from a relaxed position relative to the intermediate section 86, as illustrated in FIG. 2, to a deflected position, as indicated by the arrow D of FIG. 2. A biasing member, or torsion spring 94, biases the fingergrip portion 88 into its relaxed position. Thus, the fingergrip portion 88 is moveable toward its deflected position against the biasing force of the spring 94. An exemplary embodiment of a collapsible lever is described in greater detail in Applicant's U.S. Pat. No. 6,393,936, filed Nov. 20, 2000, which is incorporated by reference herein.

An engagement portion is rotatably supported by a portion of the lever 36 and is in contact with an exposed end surface, or face, of the piston 74. Specifically, the illustrated engagement portion comprises a roller 96 rotatably supported on a shaft 98 between a pair of extending flange portions 99 of the intermediate section 86. Although the illustrated roller 96 comprises a bearing assembly, the roller may also comprise a one-piece, circular member that directly contacts the shaft 98. Alternatively, a bearing assembly may be interposed between a separate roller member and the shaft 98.

The illustrated bearing assembly comprises a plurality of bearing members, or ball bearings 96a positioned between bearing contact surfaces of an inner bearing race 96b and an outer bearing race 96c. Each of the ball bearings 96a have a diameter that is significantly less than both a diameter Di of the inner bearing race 96b bearing contact surface and a diameter Do of the outer bearing race 96c bearing contact surface. Desirably, the diameter of the ball bearings 96a is less than one half of the diameter Di of the inner race 96b. Preferably, the diameter of the ball bearings 96a is less than one third and, more preferably, is approximately one fourth of the diameter Di of the inner race 96b. As a result, the total contact surface area between the ball bearings 96a and the inner and outer bearing races 96b, 96c is significantly less than the surface area of either the inner or outer bearing races 96b, 96c. Therefore, the bearing assembly advantageously reduces the contact surface area between the lever 36 and the engagement portion 96, thereby desirably minimizing the frictional force that tends to inhibit rotation of the engagement portion 96, as is described in greater detail below. Although a ball bearing assembly is illustrated, any suitable type of bearing assembly may be used, as may be determined by one of skill in the art.

Figure 4:
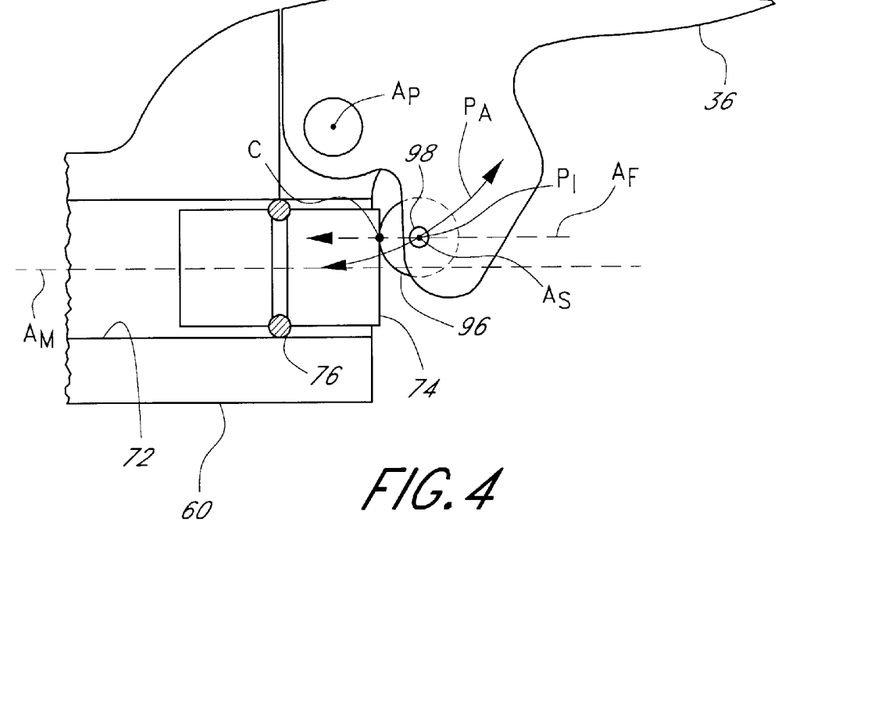
FIG. 4 is a schematic illustration of the control lever of FIG. 1 in an unengaged position of the front brake assembly.
Figure 5:
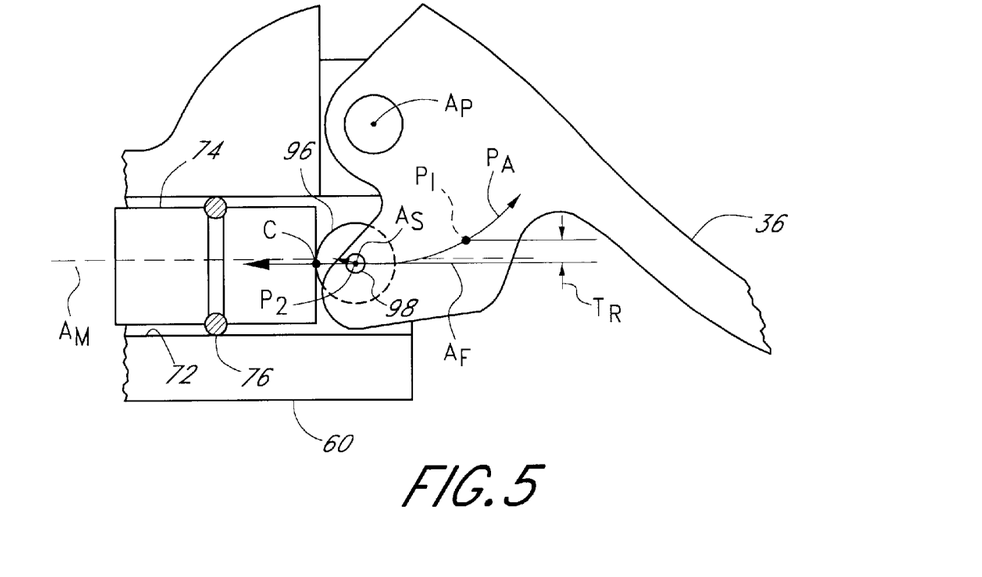
FIG. 5 is a schematic illustration of the control lever of FIG. 4 in an engaged position of the front brake assembly.

In operation, the roller 96 is free to rotate about an axis As of the shaft 98 as the lever 36 moves from its relaxed position to its actuated position. As illustrated in FIGS. 4 and 5, the shaft 98 moves in an arcuate path $P_A$ about the pivot axis $A_P$ when the lever 36 is moved toward its actuated position. As a result, the roller 96 rolls across the face of the piston 74, while at the same time pushing the piston 74 inwardly along its axis of motion $A_M$.

A contact point C is defined at the location where the roller 96 contacts the face of the piston 74 in a plane perpendicular to the shaft axis $A_P$. Although described as a single point, in actuality the roller 96 contacts the piston 74 over a small area due to the thickness of the roller 96. However, the assumption of a single contact point C is valid to demonstrate the benefits of the lever 36. The contact point C moves a distance $T_R$ across the face of the piston 74, from a first position $P_1$ to a second position $P_2$, as the lever 36 moves from its relaxed position to its actuated position. The distance TR is influenced by the linear distance between the pivot axis $A_P$ and the shaft axis $A_S$, as may be determined by one of skill in the art.

The lever 36 exerts a pushing force on the piston 74 as the lever 36 is moved toward its actuated position. Because the roller 96 is free to rotate, at any position of the lever 36, the force applied to the piston 74 is directed along an axis $A_F$, which passes through the axis $A_S$ of the shaft 98 and the contact point C. Thus, at any position of the lever 36, the direction of the force applied to the piston 74 (i.e., along the axis $A_F$) is aligned with the axis of motion $A_M$ of the piston 74. Accordingly, there is substantially no transverse force applied to the piston 74, throughout the movement of the lever 36. As a result, premature wear of the seal member 76, the piston 74 and the cylinder 72 is prevented. Significantly, the movement of the piston 74 desirably occurs with minimal friction, due to the absence of transverse loading, which provides good lever "feel" to the rider of the motorcycle 10.

Figure 6:
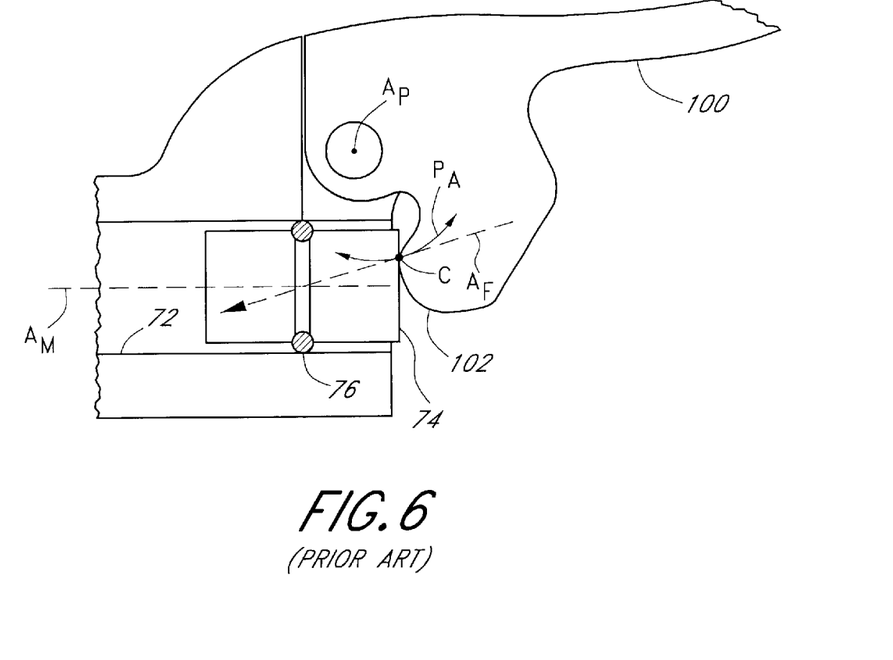
FIG. 6 is a schematic illustration of the a prior art control lever in an unengaged position of the front brake assembly.
Figure 7:
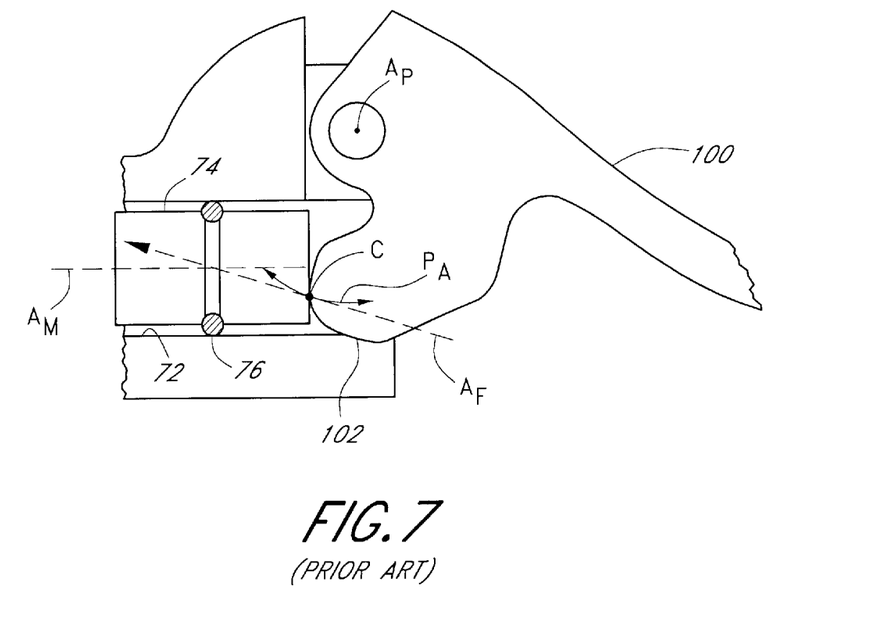
FIG. 7 is a schematic illustration of the prior art control lever of FIG. 6 in an engaged position of the front brake assembly.

In contrast, FIGS. 6 and 7 illustrate a prior art lever 100, which utilizes a cam engagement surface 102. FIG. 6 illustrates the lever 100 in a relaxed position and FIG. 7 illustrates the lever 100 in an actuated position. The cam engagement surface 102 moves in an arcuate path $P_A$ about the pivot axis $A_P$ as the lever 100 is moved from a relaxed position towards its actuated position. As a result, the cam engagement surface 102 slides transversely across the face of the piston 74.

In contrast to the preferred lever 36 of FIGS. 1–5, because the cam engagement surface 102 of the lever 100 does not rotate, the force applied to the piston 74 is in a direction tangential to the arcuate path $P_A$ of the lever 100. This is illustrated by the axis $A_F$ in FIGS. 6 and 7, which passes through the contact point C between the cam surface 102 and the piston 74 and is tangential to the path $P_A$ of the lever 100.

As a result, a transverse load is applied to the piston 74 as it is pushed inwardly by the cam engagement surface 102 of the lever 100. As discussed above, this transverse loading may cause uneven wear of the O-ring 76 and may even result in contact between the piston 74 and the inner surface of the master cylinder 72. Over time, this may result in leaking of hydraulic fluid between the inner surface of the master cylinder 72 and the seal member, or O-ring 76. Further, the transverse load increases the friction between the piston 74 and the inner surface of the cylinder 72, thereby increasing the resistance to movement of the piston 74 and reducing the rider's "feel" for the engagement of the brake 78 (FIG. 1).

As described above, frictional forces present during operation of the lever 36 also negatively impact the rider's "feel" for the operation of the braking system 60. The lever 36 of FIGS. 1–5 advantageously minimizes the amount of friction between the lever 36 and the piston 74 and the amount of friction within the lever 36 itself (referred to in combination as "operational friction"). For example, as mentioned above, the illustrated engagement portion, or roller 96, is able to rotate with respect to the body portion of the lever 36 with minimal frictional resistance, due at least in part to the small contact surface area between the moving parts of the bearing assembly. In addition, the roller 96 rolls across the face of the piston 74, which results in only a small amount of friction in comparison to the sliding movement of the prior art lever 100 of FIGS. 6 and 7. Accordingly, the minimal operational friction of the preferred lever 36 provides a rider of the motorcycle 10 with an accurate indication of the braking force generated for a given amount of force applied to the lever 36. As a result, the rider is better able to control the operation of the motorcycle 10.

Furthermore, the sliding movement of the cam surface 102 of the prior art lever 100 on the piston 74 tends to wear a groove into the face of the piston 74. The resulting groove often has an irregular contact surface for the cam surface 102 to slide upon, which inhibits smooth movement of the cam surface 102 across the face of the piston 74. Thus, in operation, the actuating movement of the lever 100 does not apply a consistent actuating force to the piston 74, which reduces the rider's control of the motorcycle 10. Advantageously, the rolling action of the present lever 36 does not cause significant wear of the face of the piston 74 and, thus, at least substantially eliminates this problem.

Figure 8A:
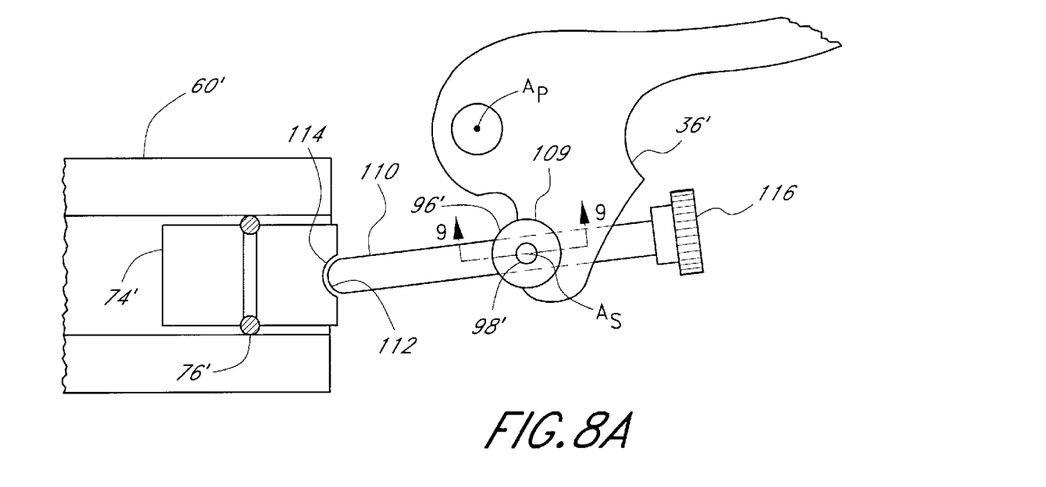
FIG. 8A is a schematic illustration of a modification of the control lever of FIG. 1 in a relaxed position.
Figure 8B:
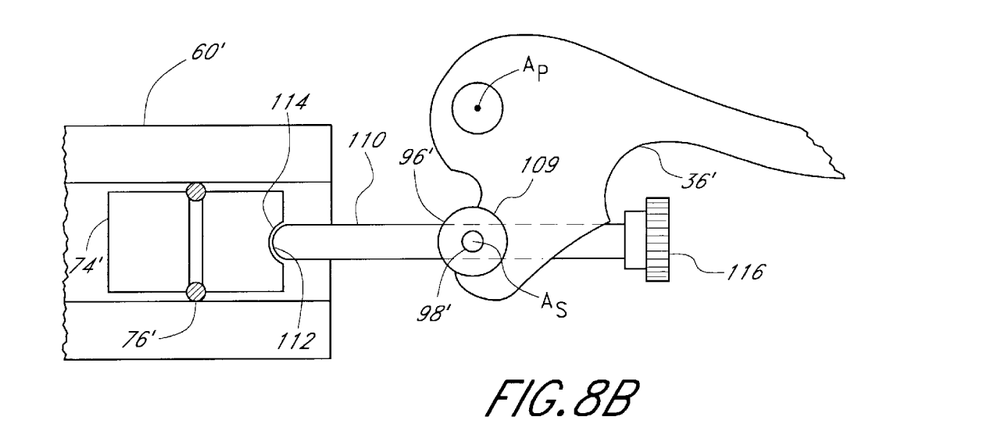
FIG. 8B illustrates the lever of FIG. 8A in an actuated position.
Figure 9:
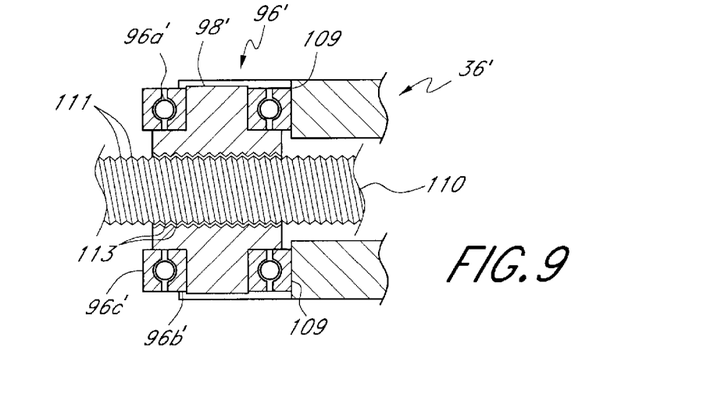
FIG. 9 is a cross section of the control lever of FIG. 8 taken along the line 9—9 of FIG. 8A

FIGS. 8A, 8B and 9 illustrate a modification of the lever assembly 36 of FIGS. 1–5, which is referred to by the reference numeral 36'. The lever 36' is substantially similar to the lever 36 of FIGS. 1–5 and, therefore, like reference numerals describe like components, except that a prime (') is added. The relaxed position of the lever 36 is shown in FIG. 8A and the actuated position is shown in FIG. 8B.

The lever 36' is configured to be used with another common type of brake or clutch assembly 60' in which the piston 74' is spaced a greater distance from the pivot axis $A_P$ in comparison to the brake assembly 60 of FIGS. 1–5. The greater spacing of the piston 74' from the pivot axis $A_P$ may be utilized to provide a seal member, e.g., a rubber boot (not shown), between the piston 74' and the lever 36' to inhibit dust or dirt from coming into contact with the piston 74' and causing wear or damage to the piston 74' or seal member 76'.

As illustrated in FIGS. 8A and 8B, the roller 96' is received in a circular pocket 109 of the lever 36' and includes a protruding arm portion 110 which extends from the main body of the roller 96' towards the piston 74'. A rounded, distal end 112 of the arm portion 110 is in contact with the face of the piston 74'. The face of the piston 74' may include a recess 114 to receive the distal end 112.

With reference to FIG. 9, the illustrated roller 96' incorporates a pair of bearings, in a manner similar to the lever 36 of FIGS. 1–5, to reduce the amount of friction inhibiting rotation of the roller 96', which improves the "feel" of the lever 36'. However, in contrast to the previous embodiment, the roller 96', or bearing assembly, supports the shaft 98' for rotation relative to the lever 36'. Preferably, the diameter of the shaft 98' is substantially equal to the diameter $D_S$ of the shaft 98 of the lever 36 of FIGS. 1–5.

The arm 110 preferably passes through the roller 96' and includes external threads 111 that mate with internal threads 113 of the roller 96'. An adjustment knob 116 is affixed to a proximal end of the arm 110. Rotation of the adjustment knob 116 changes the axial position of the arm 110 with respect to the roller 96', due to the threaded connection between them. Thus, the adjustment knob 116 may be used to alter the angular position of the lever 36' in its relaxed position.

Figure 10:
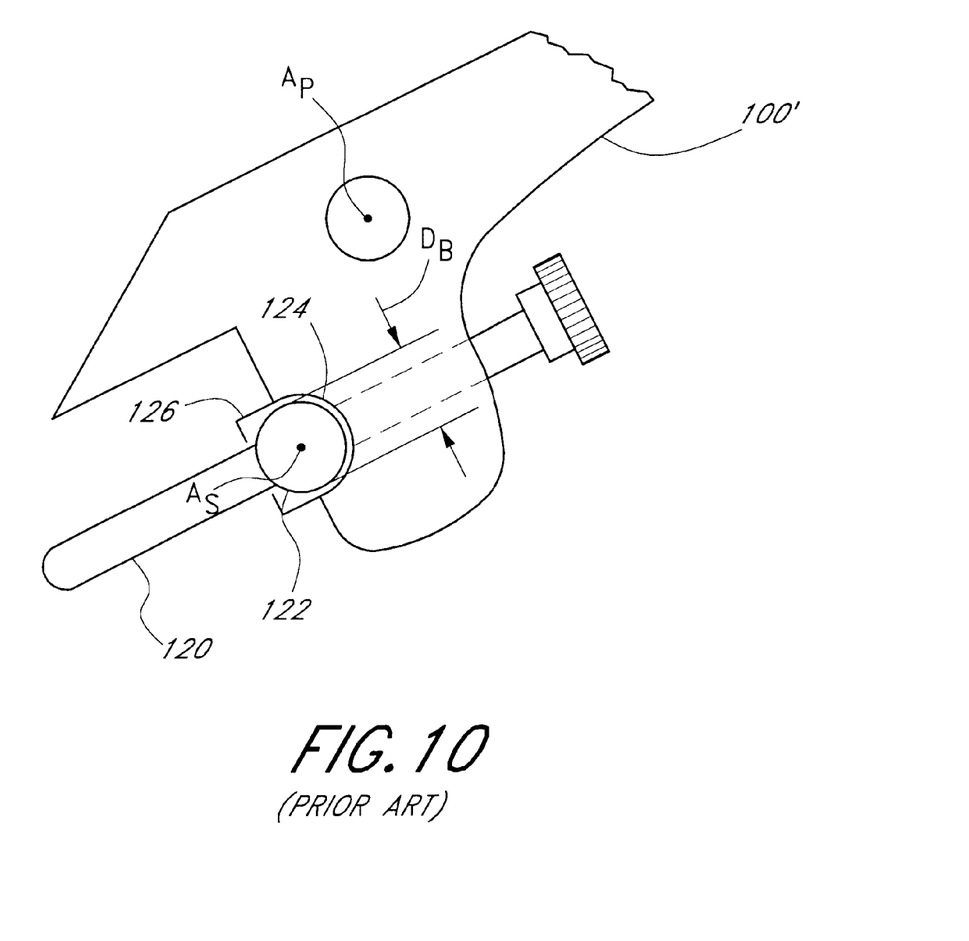
FIG. 10 is a schematic illustration of portion of a prior art control lever.

FIG. 10 illustrates a prior art lever 100' constructed for use with similar control systems as the lever 36' of FIG. 8. The lever 100' is substantially similar to the lever 100 of FIGS. 6–7 and like reference numerals are used to denote like components, except that a prime (') is added. The lever 100' of FIG. 10 includes a protruding arm portion 120, which extends from a large diameter barrel portion 122. The barrel portion 122 is retained in a pocket 124 of the lever body 100' simply by being positioned between the piston (not shown) and the lever 100' or, optionally, by a retaining member 126.

As the lever 100' is rotated to move the piston (not shown) along its linear path of travel, the barrel portion 122 rotates with respect to the lever body 100' about an axis $A_S$, defined by the center axis of the barrel portion 122. However, due to the large diameter $D_B$ of the semi-cylindrical contact surfaces between the barrel portion 122 and the pocket 124, the frictional force produced between the lever 100 and the barrel portion 122 is relatively large. This is because the large diameter $D_B$ of the barrel portion 122 results in the frictional force acting at a relatively large distance from the axis $A_S$.

In addition, the contact surface area between the pocket 124 of the lever 100' and the barrel portion 122 is large due to the large diameter $D_B$ of the barrel portion 122 and because maintaining a minimum thickness of the barrel portion 122 is desirable to provide durability to the lever 100'. Because the frictional force is influenced by the contact surface area, the lever 100' of FIG. 10 produces a large frictional force. The frictional force produced may be sufficient to inhibit rotation of the barrel portion 122 relative to the lever 100' and thereby induce a relatively large transverse load on the piston. Further, the friction between the lever 100' and the barrel portion 122 reduces the ability of the rider to "feel" the amount of force being applied to the brake 78 (FIG. 1).

In the prior art lever 100' of FIG. 10, the distance from the axis As to the contact surface is approximately 4.575 millimeters (mm). Further, assuming continuous contact between one half of the circumference of the barrel portion 122 and the lever 100', the contact surface area between the pocket 124 and the barrel 124 of a prior art lever 100' of the type illustrated is approximately 115 mm². Although the actual contact area may be less due to an imperfect fit between the barrel portion 122 and the pocket 124, this value represents the theoretical contact area if the barrel portion 122 and pocket 124 are in continuous contact along one half of their diameters. Accordingly, the theoretical contact area is useful for comparison between the preferred levers 36, 36' and the prior art lever 100'.

Advantageously, a lever 36, 36' as disclosed herein desirably has less contact area between the movable portions of the lever than that of the lever 100' of FIG. 10, due at least in part to the small diameter $D_S$ of the shaft 98, 98'. This assumes a thickness of the engagement portion 96, 96' substantially equivalent to the thickness of the barrel portion 122 of the prior art lever 100'. In addition, a preferred lever 36, 36' desirably has a smaller distance between the shaft axis $A_S$ and the contact surfaces of the movable portions than that of the lever 100' of FIG. 10. For example, if the lever 36, 36' is constructed with a one-piece roller 96, 96' in direct contact with the shaft 98, 98' (i.e., without a bearing assembly), the contact area is one half of the outer surface area of the shaft 98, 98' and the contact distance is the distance between the outer surface of the shaft 98, 98' and the shaft axis $A_S$. In this example, the distance from the shaft axis $A_S$ to the contact surface desirably is less than approximately 4.575 mm. Preferably, the distance is less than about 3.08 mm and more preferably is approximately 1.59 mm. Desirably, the contact area between the roller 96 and the shaft 98 is less than approximately 115 mm$^2$. Preferably, the contact area is less than about 67.5 mm$^2$ and more preferably is approximately 20 mm$^2$. Advantageously, the internal mounting arrangement of the roller 96, 96' (i.e., rotational about the shaft 98, 98') promotes reduced contact area and contact distance of the preferred levers 36, 36'.

Accordingly, the distance from the shaft axis As to the contact surface is reduced by over 65% with a preferred lever 36, 36' in comparison to the lever 100' illustrated in FIG. 10. Further, the contact surface area between the movable portions of the lever 36, 36' is reduced by approximately 83% in comparison to the lever 100' illustrated in FIG. 10. If, as is preferred, the roller 96, 96' comprises a bearing assembly, the contact surface may be reduced substantially from the example given above. As a result of either embodiment, with or without a bearing assembly, operational friction of the lever 36, 36' is substantially reduced in comparison with the prior art and the rider is provided with a drastically improved feel and control of the braking force imparted on the braking system 60 of the motorcycle 10. The control lever 36' of FIGS. 8A and 8B may not inhibit transverse load from being applied to the piston 74' as effectively as the control lever 36 of FIGS. 1–5, however, the design of the control lever 36' is desirable as being interchangeable with the prior art lever 100' of FIG. 10. Accordingly, the benefits of substantially reduced friction that is achieved with the present lever 36' may be utilized in braking systems that employ levers 100' of the type illustrated in FIG. 10. Similar advantages result when a preferred lever 36, 36' is utilized with other control systems or vehicles.

Although the present invention has been described in terms of certain preferred embodiments, other embodiments apparent to those of ordinary skill in the art are also within the scope of this invention. Thus, various changes and modifications may be made without departing from the spirit and scope of the invention. Moreover, not all of the features, aspects and advantages are necessarily required to practice the invention. Accordingly, the present invention is not intended to be limited by the recitation of preferred embodiments, but is intended to be defined solely by reference to the appended claims.

What is claimed is:

1. A control lever assembly for actuating a control system of a vehicle, said control system comprising a first portion mounted proximate a hand grip portion of said vehicle and defining a fluid cylinder, a piston movable along a longitudinal first axis of said fluid cylinder, said control lever assembly comprising:

a lever body having a finger grip portion, said lever body defining a second axis substantially perpendicular to said first axis, said lever body being rotatable about said second axis to move said piston from a relaxed position to an actuated position, said lever body defining a third axis substantially parallel to said second axis;

an engagement portion contacting said piston, said engagement portion rotating about said third axis when said lever body is rotated about said second axis, a force applied by said engagement portion to said piston moving said piston from said relaxed position to said actuated position;

wherein said first axis is fixed with respect to said second axis, and said force is substantially aligned with said first axis when said piston is in both of said relaxed and actuated positions.

2. The control lever of claim 1, wherein said force is substantially aligned with said first axis throughout a range of motion of said lever body.

3. The control lever of claim 1, wherein said engagement portion comprises a bearing assembly.

4. The control lever of claim 1, wherein said vehicle comprises an off-road motorcycle and said control system comprises a front brake assembly.

5. A control lever assembly for actuating a control system of a vehicle, said control system comprising a first portion mounted proximate a hand grip portion of said vehicle and defining a fluid cylinder, a piston movable along a longitudinal first axis of said fluid cylinder, said control lever assembly comprising:

a lever body having a finger grip portion, said lever body defining a second axis substantially perpendicular to said first axis, said lever body being rotatable about said second axis to move said piston from a relaxed position to an actuated position, said lever body defining a third axis substantially parallel to said second axis;

an engagement portion contacting said piston, said engagement portion rotating about said third axis when said lever body is rotated about said second axis, a force applied by said engagement portion to said piston moving said piston from said relaxed position to said actuated position;

wherein said force is substantially aligned with said first axis when said piston is in both of said relaxed and actuated positions, and wherein said lever body additionally comprises an intermediate portion and a biasing member, said biasing member urging said finger grip portion into a normal position of said control lever, said finger grip portion being movable relative to said intermediate portion against the biasing force of the biasing member to a deflected position of said control lever.

6. A control lever assembly for actuating a control system of a vehicle, said control system comprising a first portion mounted proximate a hand grip portion of said vehicle and defining a fluid cylinder, a piston movable along a longitudinal first axis of said fluid cylinder, said control lever assembly comprising:

a lever body having a finger grip portion, said lever body defining a second axis substantially perpendicular to said first axis, said lever body being rotatable about said second axis to move said piston from a relaxed position to an actuated position, said lever body defining a third axis substantially parallel to said second axis;

an engagement portion defining a circular peripheral edge surface about said third axis, said peripheral edge surface contacting said piston, said engagement portion rotating about said third axis when said lever body is rotated about said second axis, a force applied by said engagement portion to said piston moving said piston from said relaxed position to said actuated position, and wherein said first axis is fixed with respect to said second axis.

7. The control lever of claim 6, wherein said force is substantially aligned with said first axis when said piston is in both of said relaxed and actuated positions.

8. The control lever of claim 6, wherein said force is substantially aligned with said first axis throughout a range of motion of said lever body.

9. The control lever of claim 6, wherein said engagement portion comprises a bearing assembly.

10. The control lever of claim 6, wherein said vehicle comprises an off-road motorcycle and said control system comprises a front brake assembly.

11. A control lever assembly for actuating a control system of a vehicle, said control system comprising a first portion mounted proximate a hand grip portion of said vehicle and defining a fluid cylinder, a piston movable along a longitudinal first axis of said fluid cylinder, said control lever assembly comprising:

a lever body having a finger grip portion, said lever body defining a second axis substantially perpendicular to said first axis, said lever body being rotatable about said second axis to move said piston from a relaxed position to an actuated position, said lever body defining a third axis substantially parallel to said second axis;

an engagement portion defining a circular peripheral edge surface about said third axis, said peripheral edge surface contacting said piston, said engagement portion rotating about said third axis when said lever body is rotated about said second axis, a force applied by said engagement portion to said piston moving said piston from said relaxed position to said actuated position, and wherein said lever body additionally comprises an intermediate portion and a biasing member, said biasing member urging said finger grip portion into a normal position of said control lever, said finger grip portion being movable relative to said intermediate portion against the biasing force of the biasing member to a deflected position of said control lever.

12. A control lever assembly for actuating a control system of a vehicle, said control system comprising a first portion mounted proximate a hand grip portion of said vehicle and defining a first fluid cylinder, a piston movable along a longitudinal first axis of said first fluid cylinder, said control lever assembly comprising:

a lever body having a finger grip portion, said lever body defining a second axis substantially perpendicular to said first axis, said lever body being rotatable about said second axis to move said piston from a first position to a second position;

a shaft fixed to said lever body and defining a third axis substantially parallel to said second axis;

an engagement portion rotatably supported by said shaft, said engagement portion defining a contact surface for contacting said piston and being configured to rotate about said third axis when said lever body is rotated about said second axis to move said piston from said first position to said second position.

13. The control lever of claim 12, wherein the engagement portion additionally comprises an arm portion, said arm defining said contact surface for contacting said piston.

14. The control lever of claim 12, wherein said engagement portion comprises a bearing assembly.

15. The control lever of claim 12, wherein said lever body additionally comprises an intermediate portion and a biasing member, said biasing member urging said finger grip portion into a normal position of said control lever, said finger grip portion being movable relative to said intermediate portion against the biasing force of the biasing member to a deflected position of said control lever.

16. The control lever of claim 12, wherein said vehicle comprises an off-road motorcycle and said control system comprises a front brake assembly.

17. A control lever assembly for actuating a control system of a vehicle, said control system comprising a first portion mounted proximate a hand grip portion of said vehicle and defining a first fluid cylinder, a piston movable along a longitudinal first axis of said first fluid cylinder, said control lever assembly comprising:

a lever body having a finger grip portion, said lever body defining a second axis substantially perpendicular to said first axis, said lever body being rotatable about said second axis to move said piston from a first position to a second position, said lever body defining a third axis substantially parallel to said second axis and a first bearing surface having a first bearing surface area;

an engagement portion comprising an arm portion defining a contact surface for contacting said piston, said engagement portion defining a second bearing surface facing said first bearing surface having a second bearing surface area; and a bearing assembly operably positioned between said lever body and said engagement portion to permit said engagement portion to rotate about said third axis when said lever body is rotated about said second axis to move said piston from said first position to said second position, said bearing assembly comprising a plurality of bearing members, each bearing member contacting said first bearing surface and said second bearing surface along a contact surface area, the total of said contact surface area for said plurality of bearing members being substantially smaller than either of said first bearing surface area and said second bearing surface area.

* * * * *